(12) United States Patent
Yang et al.

(10) Patent No.: US 11,303,198 B2
(45) Date of Patent: Apr. 12, 2022

(54) ISOLATED SWITCHING CONVERTER, CONTROL CIRCUIT AND CONTROL METHOD THEREOF

(71) Applicant: Silergy Semiconductor Technology (Hangzhou) LTD, Hangzhou (CN)

(72) Inventors: Xiaoyu Yang, Hangzhou (CN); Yongjiang Bai, Hangzhou (CN); Qiukai Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 181 days.

(21) Appl. No.: 16/704,049

(22) Filed: Dec. 5, 2019

(65) Prior Publication Data
US 2020/0195150 A1 Jun. 18, 2020

(30) Foreign Application Priority Data
Dec. 12, 2018 (CN) .......................... 201811519043.5

(51) Int. Cl.
| G05F 1/571 | (2006.01) |
| H02H 3/20 | (2006.01) |
| H02M 1/32 | (2007.01) |
| H02M 3/335 | (2006.01) |
| H02H 7/12 | (2006.01) |

(52) U.S. Cl.
CPC .......... *H02M 1/32* (2013.01); *H02M 3/33507* (2013.01); *H02M 3/33523* (2013.01); *H02M 3/33592* (2013.01); *G05F 1/571* (2013.01); *H02H 3/20* (2013.01); *H02H 7/1213* (2013.01)

(58) Field of Classification Search
CPC .................................. G05F 1/571; H02H 3/20
USPC ................... 323/274, 276, 284; 361/86, 91.1
See application file for complete search history.

(56) References Cited

U.S. PATENT DOCUMENTS

| 6,005,780 A | 12/1999 | Hua |
| 6,580,258 B2 | 6/2003 | Wilcox et al. |
| 9,219,420 B1* | 12/2015 | Zhang ............... H02M 3/33507 |
| 9,325,254 B2 | 4/2016 | Deng et al. |
| 9,331,588 B2 | 5/2016 | Chen |
| 9,488,680 B2 | 11/2016 | Xu |
| 9,541,974 B1 | 1/2017 | Presti et al. |
| 9,584,017 B1* | 2/2017 | Sundararaj ............ H02M 3/156 |
| 9,729,052 B1 | 8/2017 | Chakraborty et al. |
| 9,791,676 B2 | 10/2017 | Munro |
| 2005/0116692 A1 | 6/2005 | Sugiyama |
| 2008/0284388 A1 | 11/2008 | Oettinger et al. |
| 2009/0016086 A1 | 1/2009 | Huynh et al. |
| 2014/0078789 A1 | 3/2014 | Li et al. |
| 2014/0198540 A1* | 7/2014 | Xu ..................... H02M 3/33523 |
| | | 363/21.12 |
| 2014/0239934 A1 | 8/2014 | Zhang |
| 2015/0103569 A1* | 4/2015 | Zhang ............... H02M 3/33507 |
| | | 363/21.16 |

(Continued)

*Primary Examiner* — Gary A Nash

(57) ABSTRACT

A method of controlling an isolated switching converter having an output voltage that is adjustable, can include: sampling an output voltage of the isolated switching converter; setting an overvoltage protection threshold corresponding to the output voltage of the isolated switching converter when the isolated switching converter enters a protection mode; and triggering the overvoltage protection by comparing an output voltage feedback signal representing the output voltage against the overvoltage protection threshold.

18 Claims, 12 Drawing Sheets

(56) References Cited

U.S. PATENT DOCUMENTS

| | | | |
|---|---|---|---|
| 2015/0160270 A1 | 6/2015 | Shi et al. | |
| 2015/0280578 A1* | 10/2015 | Huang | H02M 1/32 363/21.12 |
| 2016/0020700 A1* | 1/2016 | Zhang | H02M 3/33576 363/21.16 |
| 2016/0172999 A1* | 6/2016 | Fogg | H02M 3/1588 363/53 |
| 2016/0190936 A1* | 6/2016 | Ke | H02M 3/33507 363/21.12 |
| 2016/0352094 A1* | 12/2016 | Yang | H02H 3/207 |
| 2017/0133939 A1* | 5/2017 | Zhang | H02M 3/33507 |
| 2018/0123339 A1 | 5/2018 | Lin et al. | |
| 2020/0195150 A1 | 6/2020 | Yang et al. | |

* cited by examiner

ISOLATED SWITCHING CONVERTER, CONTROL CIRCUIT AND CONTROL METHOD THEREOF

RELATED APPLICATIONS

This application claims the benefit of Chinese Patent Application No. 201811519043.5, filed on Dec. 12, 2018, which is incorporated herein by reference in its entirety.

FIELD OF THE INVENTION

The present invention generally relates to the field of power electronics, and more particularly to isolated switching converters, and associated control circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Isolated switching converters are widely used in various off-line power supply systems. The isolated switching converter usually includes a primary circuit and a secondary circuit. By controlling on and off states of a power switch in the primary circuit, a constant voltage or a constant current can be generated from the secondary circuit. In order to prevent an overvoltage of the output voltage from damaging the circuit, overvoltage protection can be triggered when overvoltage occurs. Generally, the isolated switching converter may set a fixed overvoltage protection threshold to trigger overvoltage protection when the output voltage is greater than the overvoltage protection threshold. However, if the overvoltage protection threshold is set too low, this can lead to false triggering of overvoltage protection when the voltage demand of the load device is relatively high. When the overvoltage protection threshold is set relatively high, overvoltage protection can only be triggered when the output voltage increases to that high level, which may be a risk of overvoltage damage when the voltage demand of load device is relatively low.

In one embodiment, a control circuit for an isolated switching converter is configured to determine whether to trigger an overvoltage protection in accordance with a comparison signal generated by comparing an output voltage feedback signal representing an output voltage of the isolated switching converter against an overvoltage protection threshold; and the overvoltage protection threshold corresponds to the output voltage when the isolated switching converter enters a protection mode.

Figure 1:
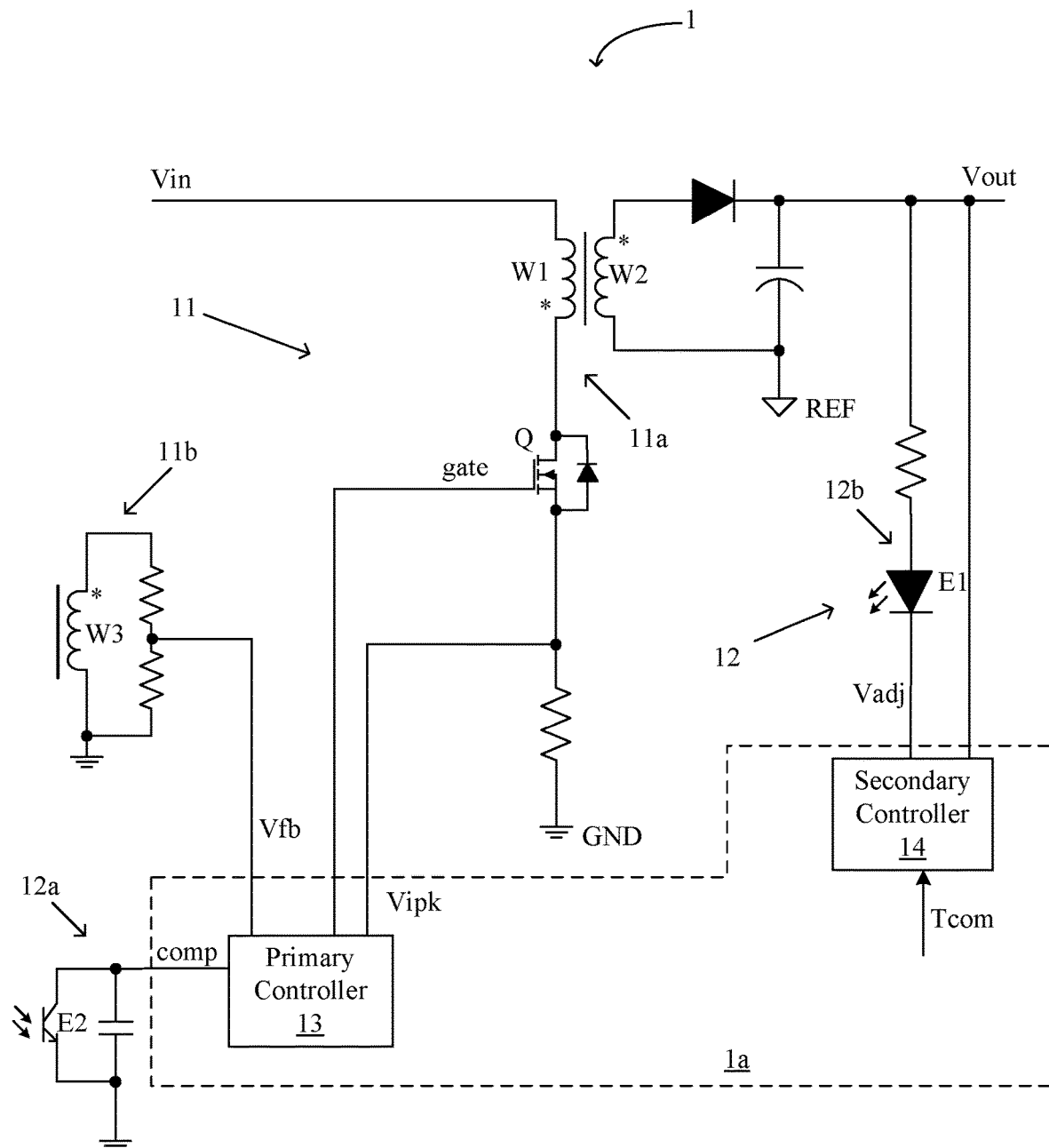
FIG. 1 is a schematic block diagram of a first example isolated switching converter, in accordance with embodiments of the present invention.

Referring now to FIG. 1, shown is a schematic block diagram of a first example isolated switching converter, in accordance with embodiments of the present invention. In particular embodiments, an output voltage of the isolated switching converter is adjustable. Isolated switching converter 1 can include power stage 11 (e.g., including circuits 11a and 11b), photoelectric coupling circuit 12 (e.g., including circuits 12a and 12b), and control circuit 1a. Control circuit 1a includes primary controller 13 and secondary controller 14. For example, power stage 11 can include primary winding W1 electrically coupled to ground potential GND, secondary winding W2 electrically coupled to reference potential REF, auxiliary winding W3, and power switch Q. Also, primary winding W1 can receive input voltage Vin, secondary winding W2 may generate output voltage Vout, and auxiliary winding W3 can obtain output voltage feedback signal Vfb. Moreover, power switch Q can connect to primary winding W1 and may be controlled to be turned on and off by switching control signal "gate" in order to convert input voltage Vin into output voltage Vout.

Photoelectric coupling circuit 12 can be coupled to secondary winding W2, primary controller 13, and secondary controller 14, and may isolate the primary circuit from the secondary circuit and transmit signals through a photoelectric coupling. Secondary controller 14 may generate error signal Vadj according to output voltage setting signal Tcom and output voltage Vout, thereby controlling photoelectric coupling circuit 12 to generate compensation signal "comp." Here, output voltage setting signal Tcom can characterize the voltage required by the current load device. Primary controller 13 can be coupled to a control terminal of power switch Q and may generate switching control signal gate for power switch Q according to compensation signal comp, primary current sampling signal Vipk, and output voltage feedback signal Vfb. Here, primary current sampling signal Vipk can characterize a current flowing through power switch Q.

For example, photoelectric coupling circuit 12 can include light emitting diode E1 and phototransistor E2. Light emitting diode E1 can convert error signal Vadj into an optical signal, and phototransistor E2 may receive the optical signal and convert it into an electrical signal. Therefore, photoelectric coupling circuit 12 can isolate the primary circuit and the secondary circuit of isolated switching converter 1, and may generate compensation signal comp according to output voltage setting signal Tcom to control on and off states of power switch Q. In this way, output voltage Vout of isolated switching converter 1 can correspond to output voltage setting signal Tcom.

For example, secondary controller 14 can receive output voltage setting signal Tcom to set an output voltage reference signal and keep a peak value of the primary current of power stage 11 less than a current threshold when output voltage setting signal Tcom changes. Thus, the overvoltage protection threshold can be set to a preset value and overvoltage protection may not be triggered when output voltage setting signal Tcom changes, in order to avoid overvoltage misoperation, and thereby improve the reliability of the isolated switching converter. The output voltage reference signal can characterize an expected value of the output voltage of the power stage of the isolated switching converter. For example, secondary controller 14 can adjust the output voltage reference signal in a continuously gradual manner when output voltage setting signal Tcom changes, such that the peak value of the primary current of power stage 11 remains less than the current threshold.

Also, primary controller 13 can set the overvoltage protection threshold adapted to output voltage setting signal Tcom when detecting that the peak value of the primary current of power stage 11 reaches the current threshold, and may trigger the overvoltage protection in response to the output voltage feedback signal exceeding the overvoltage protection threshold. Thus, the overvoltage protection threshold can be set to adaptively change with output voltage Vout, and the overvoltage protection may be triggered when the secondary controller fails, thereby improving the reliability of the isolated switching converter.

Primary controller 13 can sample the output voltage feedback signal in order to acquire a sampling signal in response to detecting that the peak value of the primary current of power stage 11 reaches the current threshold in N switching cycles, and may set the overvoltage protection threshold according to the sampling signal. Therefore, the overvoltage protection threshold can be adaptively changed with output voltage Vout, and the reliability of the isolated switching converter can be improved. In this particular example, N is greater than or equal to 1.

Further, primary controller 13 can set the overvoltage protection threshold as a preset value in response to detecting that the peak value of the primary current of power stage 11 does not reach the current threshold. The preset value may be independent of the current output voltage setting signal. In some examples, the preset value can be set according to the maximum output voltage generated by the isolated switching converter. For example, if the output voltage of the isolated switching converter ranges from about 5V to about 25V, the preset value can be set to about 30V. Therefore, when output voltage Vout is controlled by output voltage setting signal Tcom to gradually increase, misoperation of the overvoltage protection can be substantially avoided, and the reliability of the isolated switching converter can accordingly be improved.

For example, primary controller 13 can set an overvoltage protection enable signal to be inactive during a period when it is not detected that the peak value of the primary current of power stage 11 reaches the current threshold, and may set the overvoltage protection enable signal to be active during a period when it is detected that the peak value of the primary current of power stage 11 reaches the current threshold. Also, primary controller 13 may not trigger the overvoltage protection when the overvoltage protection enable signal is inactive, thereby avoiding misoperation of the overvoltage protection and improving the reliability of the isolated switching converter. Further, primary controller 13 can sample and hold the voltage across auxiliary winding W3 to obtain the output voltage feedback signal.

In particular embodiments, the output voltage reference signal can be adjusted in a gradual manner when the output voltage setting signal changes, such that the peak value of the primary current of the isolated switching converter is kept less than the current threshold, and the overvoltage protection is not triggered. When the peak value of the primary current reaches the current threshold, the overvoltage protection threshold can be set corresponding to the output voltage setting signal and overvoltage protection is triggered in response to the output voltage feedback signal exceeding the overvoltage protection threshold, such that the overvoltage protection threshold can be changed adaptively with the output voltage. In this way, the reliability of the isolated switching converter can be improved.

Figure 2:
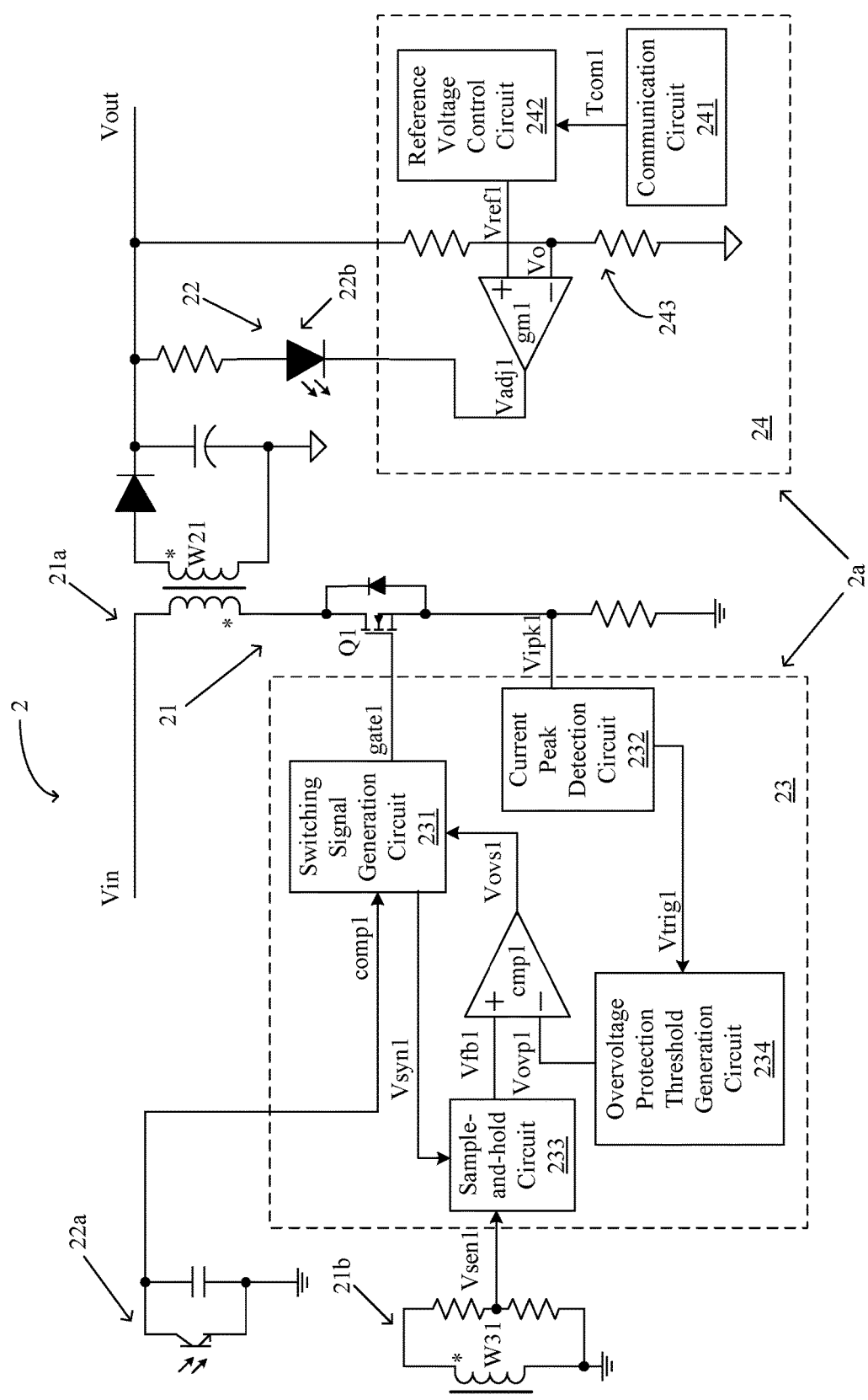
FIG. 2 is a schematic block diagram of a second example isolated switching converter, in accordance with embodiments of the present invention.

Referring now to FIG. 2, shown is a schematic block diagram of a second example isolated switching converter, in accordance with embodiments of the present invention. In this particular example, isolated switching converter 2 can include power stage 21 (e.g., including circuits 21a and 21b), photoelectric coupling circuit 22 (e.g., including circuits 22a and 22b), and control circuit 2a. Here, control circuit 2a can include primary controller 23 and secondary controller 24. Secondary controller 24 can receive output voltage setting signal Tcom1 and generate output voltage reference signal Vref1. Output voltage reference signal Vref1 may be adjusted in a continuously gradual manner when output voltage setting signal Tcom1 changes, such that the peak value of the primary current of power stage 21 remains less than the current threshold. This can prevent overvoltage protection when output voltage setting signal Tcom1 changes to avoid overvoltage misoperation and improving the reliability of the isolated switching converter.

Figure 3:
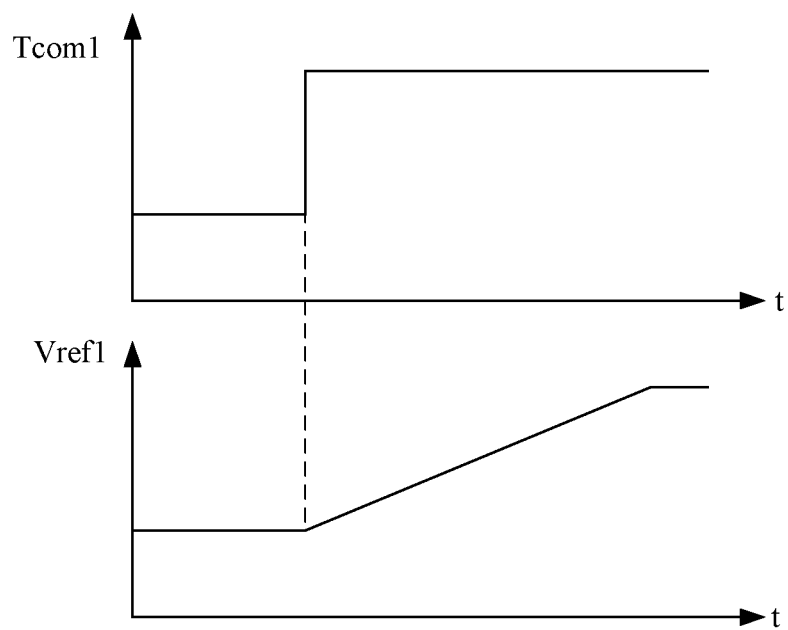
FIG. 3 is a waveform diagram of a first example output voltage reference signal, in accordance with embodiments of the present invention.
Figure 4:
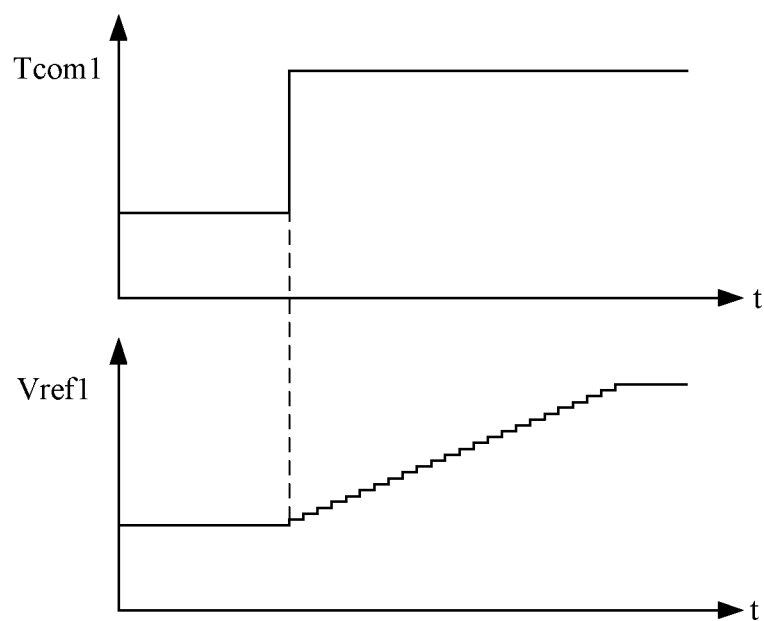
FIG. 4 is a waveform diagram of a second example output voltage reference signal, in accordance with embodiments of the present invention.

Referring now to FIGS. 3 and 4, shown are waveform diagrams of first and second example output voltage reference signals, respectively, in accordance with embodiments of the present invention. In particular embodiments, in order to avoid misoperation of overvoltage protection due to excessive primary current when load device needs to increase the output voltage, secondary controller 24 can adjust output voltage reference signal Vref1 in a continuous gradual manner (e.g., as shown in FIG. 3) or a step gradual manner (e.g., as shown in FIG. 4), such that the peak value of the primary current sampling signal may not reach the current threshold under normal operation, thereby avoiding misoperation of overvoltage protection and improving the reliability of the isolated switching converter.

In the particular example of FIG. 2, secondary controller 24 can include communication circuit 241, reference voltage control circuit 242, voltage dividing circuit 243, and error amplifier gm1. Here, communication circuit 241 can communicate with the load device to acquire a voltage required by the load device. That is, when the load device sends an instruction to change the output voltage, communication circuit 241 changes output voltage setting signal Tcom1 representing the voltage required by the load device and transmits output voltage setting signal Tcom1 to reference voltage control circuit 242.

In some examples, output voltage setting signal Tcom1 is a digital signal. Reference voltage control circuit 242 can generate output voltage reference signal Vref1 in an analog form that changes in a continuous gradual manner or a step gradual manner according to output voltage setting signal Tcom1. Voltage dividing circuit 243 can obtain output division voltage Vo representing the output voltage. Error amplifier gm1 can generate error signal Vadj1 according to output voltage reference signal Vref1 and output division voltage Vo. Photoelectric coupling circuit 22 can generate compensation signal comp1 according to error signal Vadj1, such that primary controller 23 can control the on and off states of power switch Q1 according to compensation signal comp1. Thus, output voltage Vout of isolated switching converter 2 can correspond to output voltage setting signal Tcom1.

Primary controller 23 can set an overvoltage protection threshold adapted to output voltage setting signal Tcom1 during a period when detecting that the peak value of the primary current of power stage 21 reaches the current threshold, and may trigger overvoltage protection in response to the output voltage feedback signal exceeding the overvoltage protection threshold. Thus, the overvoltage protection threshold can adaptively change with output voltage Vout, and the overvoltage protection can be triggered when the secondary controller fails, thereby improving the reliability of the isolated switching converter. Further, primary controller 23 can also generate switching control signal gate1 for controlling the on and off states of power switch Q1 according to compensation signal comp1, such that output voltage Vout of isolated switching converter 2 can correspond to output voltage setting signal Tcom1.

In this particular example, primary controller 23 can include switching signal generation circuit 231, current peak detection circuit 232, sample-and-hold circuit 233, overvoltage protection threshold generation circuit 234, and comparator cmp1. Here, current peak detection circuit 232 can acquire primary current sampling signal Vipk1 of power stage 21, and may generate peak state signal Vtrig1. Overvoltage protection threshold generation circuit 234 can set overvoltage protection threshold Vovp1 as a preset value when peak state signal Vtrig1 is in a first state, and can set overvoltage protection threshold Vovp1 as a value adapted to output voltage setting signal Tcom1 when peak state signal Vtrig1 is in a second state.

Comparator cmp1 can compare overvoltage protection threshold Vovp1 against output voltage feedback signal Vfb1, and may generate overvoltage protection flag signal Vovs1. If overvoltage protection flag signal Vovs1 is active, switching signal generation circuit 231 can trigger the overvoltage protection. That is, switching control signal gate1 can be set inactive at this time, in order to control power switch Q1 to be turned off. Also, if overvoltage protection flag signal Vovs1 is inactive, switching signal generation circuit 231 can generate switching control signal gate1 according to compensation signal comp1 to control power switch Q1 to be turned on or off, such that output voltage Vout of isolated switching converter 2 can correspond to output voltage setting signal Tcom1. Sample-and-hold circuit 233 can sample and hold a voltage across auxiliary winding W31, in order to generate output voltage feedback signal Vfb1. For example, switching signal generation circuit 231 can also generate output voltage sampling pulse signal Vsyn1 according to switching control signal gate1. And sample-and-hold circuit 233 can sample and hold the voltage across auxiliary winding W3, in order to generate output voltage feedback signal Vfb1 after receiving output voltage sampling pulse signal Vsyn1.

Figure 5:
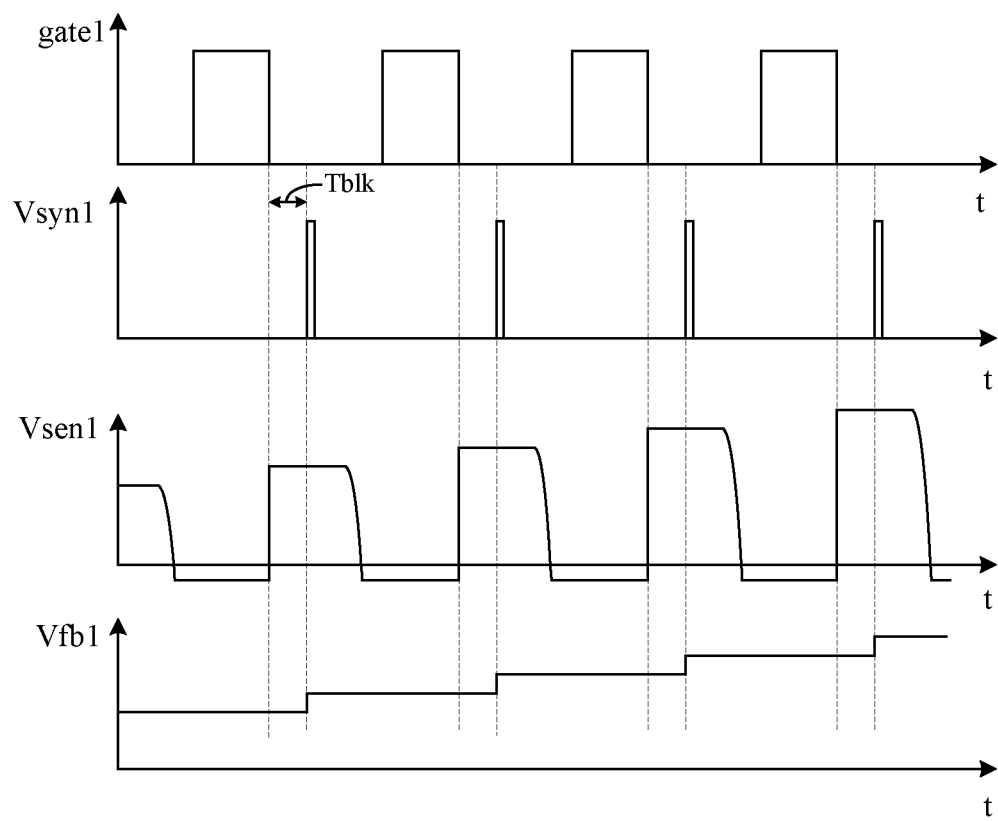
FIG. 5 is a schematic block diagram of an example sampling and holding circuit, in accordance with embodiments of the present invention.

Referring now to FIG. 5, shown is a waveform diagram of an example sample-and-hold circuit, in accordance with embodiments of the present invention. In response to switching control signal gate1 changing from a high level to a low level (e.g., a falling edge of switching control signal gate1), switching signal generation circuit 231 can activate output voltage sampling pulse signal Vsyn1 after delay time Tblk. Sample-and-hold circuit 233 can be controlled by output voltage sampling pulse signal Vsyn1 to sample and hold signal Vsen1 representing the voltage across auxiliary winding W31, in order to generate output voltage feedback signal Vfb1. For example, the voltage across auxiliary winding W31 is substantially equal to the voltage across secondary winding W21.

When output voltage Vout of the isolated switching converter increases, signal Vsen1 can increase, and then output voltage feedback signal Vfb1 may also increase. Therefore, when output voltage Vout of the isolated switching converter increases, output voltage feedback signal Vfb1 can increase stepwise. Also, when output voltage Vout of the isolated switching converter decreases, output voltage feedback signal Vfb1 can decrease stepwise. When output voltage Vout of the isolated switching converter remains essentially unchanged, output voltage feedback signal Vfb1 may also remain essentially unchanged.

Figure 6:
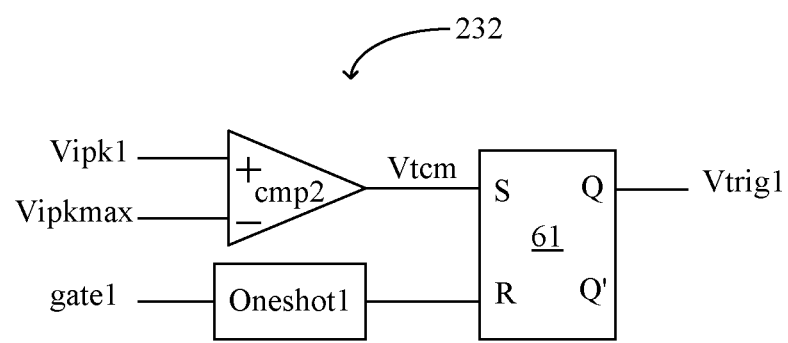
FIG. 6 is a schematic block diagram of an example current peak detection circuit, in accordance with embodiments of the present invention.

Referring now to FIG. 6, shown is a schematic block diagram of an example current peak detection circuit, in accordance with embodiments of the present invention. In this particular example, current peak detection circuit 232 can include comparator cmp2, single trigger circuit Oneshot1, and RS flip-flop circuit 61. Comparator cmp2 can compare the peak value of primary current sampling signal Vipk1 against current preset peak signal Vipkmax to generate comparison signal Vtcm. Here, current preset peak signal Vipkmax can characterize the current threshold. Single trigger Oneshot1 can generate a pulse controlled by the rising edge of switching control signal gate1. Peak state signal Vtrig1 generated by RS trigger circuit 61 can be active when comparison signal Vtcm is set to be active, and peak state signal Vtrig1 can be inactive when the pulse generated by single trigger Oneshot1 is set to be inactive.

Also, switching signal generation circuit 231 can generate the switching control signal for controlling power switch Q1 based on compensation signal comp1. Therefore, the current flowing through power switch Q1 (i.e., the primary current) may be related to compensation signal comp1. Thus, the current threshold can correspond to the maximum value of compensation signal comp1; that is, the current preset peak signal Vipkmax can correspond to the maximum value of compensation signal comp1.

Figure 7:
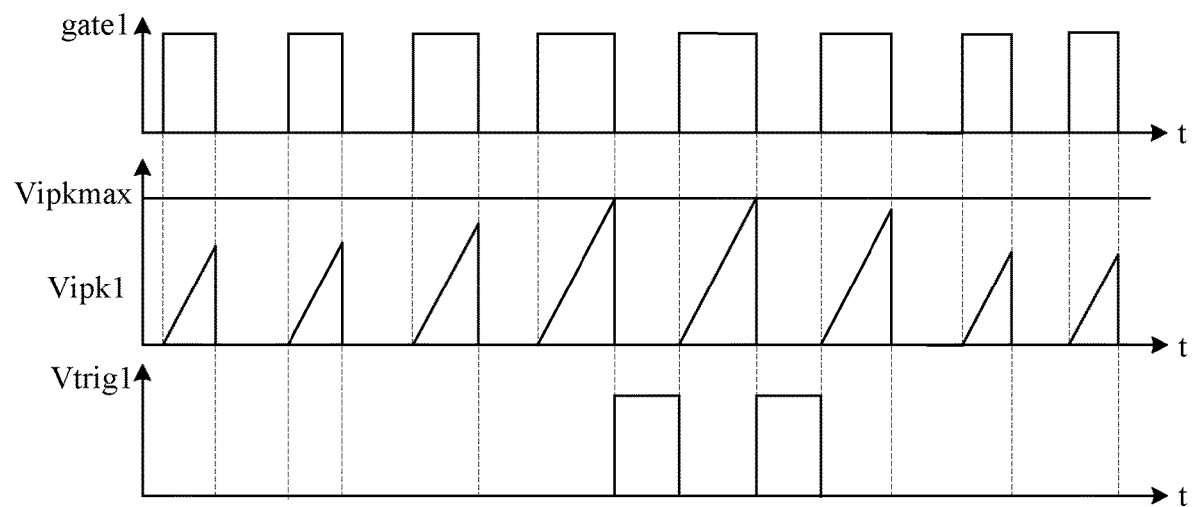
FIG. 7 is a waveform diagram of first example operation of the current peak detection circuit, in accordance with embodiments of the present invention.

Referring now to FIG. 7, shown is a waveform diagram of a first example operation of the current peak detection circuit, in accordance with embodiments of the present invention. In particular embodiments, primary current sampling signal Vipk1 can characterize the current flowing through power switch Q1. Therefore, when switching control signal gate1 is active (e.g., when switching control signal gate1 is set high), power switch Q1 can be turned on, and then primary current sampling signal Vik1 may gradually increase. When switching control signal gate1 is inactive, power switch Q1 can be turned off, and then primary current sampling signal Vipk1 may fall to 0. When the output voltage of isolated switching converter 2 increases, the output power of isolated switching converter 2 can increase, such that the primary current of isolated switching converter 2 can increase. Therefore, the change in the output voltage of isolated switching converter 2 can be detected by the peak value of the primary current. When the peak value of primary current sampling signal Vipk1 reaches current preset peak signal Vipkmax, peak state signal Vtrig1 generated by current peak detection circuit 232 may be active.

Figure 8:
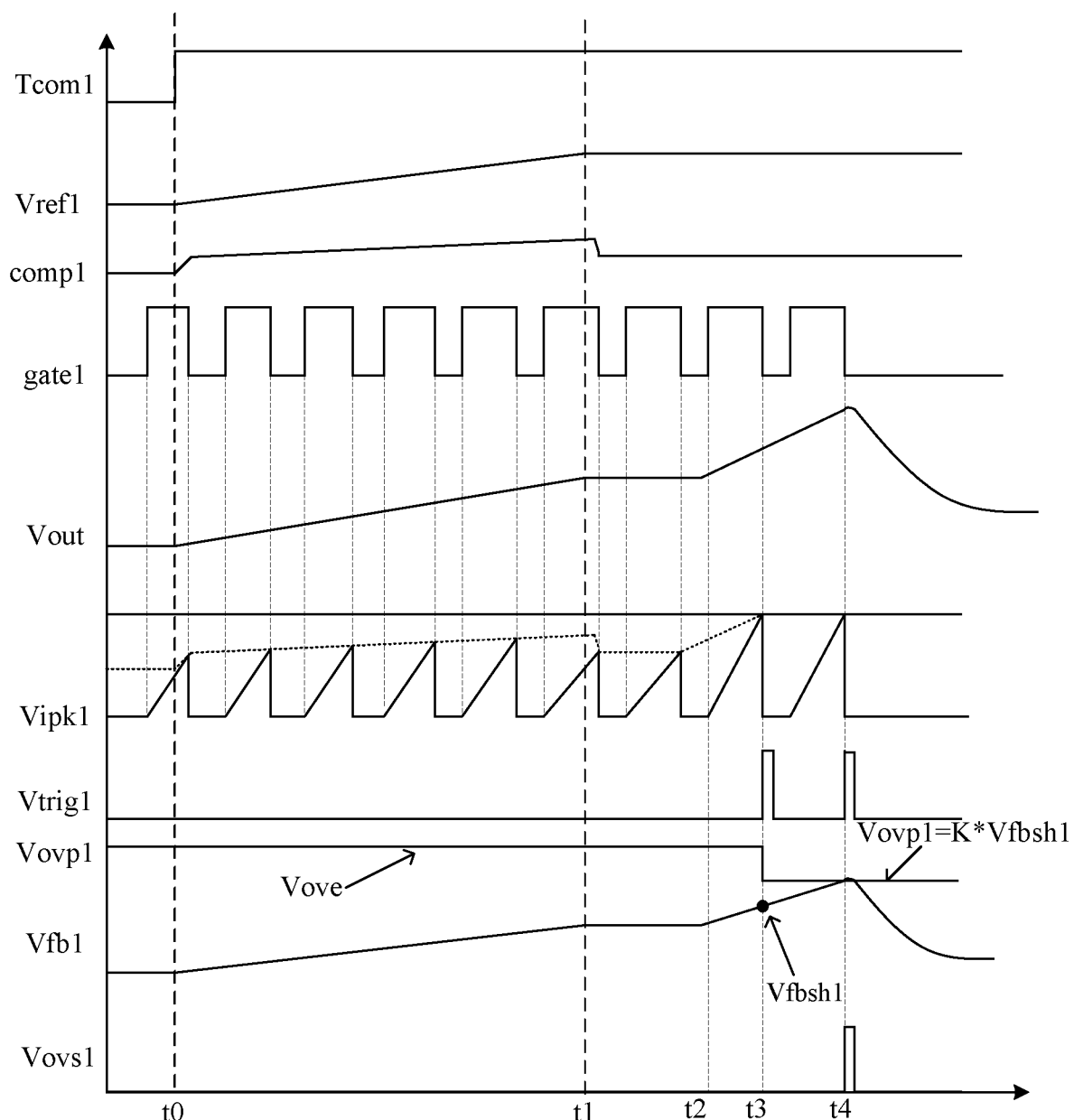
FIG. 8 is a waveform diagram of second example operation of the current peak detection circuit, in accordance with embodiments of the present invention.

Referring now to FIG. 8, shown is a waveform diagram of a second example operation of the current peak detection circuit, in accordance with embodiments of the present invention. At time t0, the load device can send an instruction to increase the output voltage, and output voltage setting signal Tcom1 generated by communication circuit 241 can increase. Here, output voltage setting signal Tcom1 may represent the voltage required by the load device. Then, reference voltage control circuit 242 can generate output voltage reference signal Vref1 based on output voltage setting signal Tcom1. For example, output voltage reference signal Vref1 can be controlled by reference voltage control circuit 242 to increase in a continuously gradual manner.

Photoelectric coupling circuit 22 can generate compensation signal comp1 that increases gradually based on output voltage reference signal Vref1. Switching signal generation circuit 231 can generate switching control signal gate1 based on compensation signal comp1. Since compensation signal comp1 gradually increases, the duty ratio of switching control signal gate1 can gradually increase, and thus output voltage Vout of the isolated switching converter can gradually increase. At time t1, output voltage Vout of the isolated switching converter can corresponds to output voltage setting signal Tcom1, and the duty ratio of switching control signal gate1 may remain constant to keep output voltage Vout of the isolated switching converter stable.

Current peak detection circuit 232 can acquire the peak value of primary current sampling signal Vipk1. During time t0 to time t1, since compensation signal comp1 gradually increases and may not increase to the maximum value, the peak value of primary current sampling signal Vipk1 may not reach current preset peak signal Vipkmax, and thus peak state signal Vtrig1 can remain inactive (e.g., the first state), such that overvoltage protection threshold Vovp1 can be set to preset value Vove. For example, preset value Vove is independent of current output voltage setting signal Tcom1. In some examples, preset value Vove can be set according to the maximum output voltage of the isolated switching converter. Therefore, output voltage feedback signal Vfb1 can remain less than preset value Vove from time t0 to time t1, and overvoltage protection flag signal Vovs1 may remain inactive. That is, primary controller 23 can control the output voltage of the isolated switching converter to increase in a gradual manner according to output voltage setting signal Tcom1 from secondary controller 24, thereby avoiding misoperation of overvoltage protection and improving the reliability of the isolated switching converter.

At time t2, the load device may not send an instruction to change the output voltage, and output voltage setting signal Tcom1 may not change. However, in this particular example, output voltage Vout of the isolated switching converter suddenly increases (e.g., due to the failure of the secondary controller, etc.). Since the power of the primary circuit is equal to that of the secondary circuit, the primary current may suddenly increase since input voltage Vin is not changed. Therefore, at time t2, primary current sampling signal Vipk1 suddenly increases and reaches current preset peak signal Vipkmax at time t3. As a result, peak state signal Vtrig1 can become active at time t3. At this time, overvoltage protection threshold Vovp1 may be set to be a value corresponding to output voltage setting signal Tcom1. In some examples, when peak state signal Vtrig1 is switched from the first state (e.g., inactive state) to the second state (e.g., active state), at time t3, overvoltage protection threshold generation circuit 234 can sample output voltage feedback signal Vfb1 to obtain sampling signal Vfbs1, and set overvoltage protection threshold Vovp1 to be K times sampling signal Vfbs1, i.e., Vovp1=K*Vfbs1, where K is a real number greater than 1 (e.g., K=1.2).

At time t4, output voltage feedback signal Vfb1 may reach overvoltage protection threshold Vovp1, and then overvoltage protection flag signal Vovs1 can be set to be active, such that switching signal generation circuit 231 can be controlled to generate an inactive switching control signal gate1. Thus, power switch Q1 may be controlled to be turned off, and output voltage Vout can be rapidly reduced. Therefore, when the secondary circuit of the isolated switching converter fails, the overvoltage protection may be triggered in order to protect the circuit.

In particular embodiments, the output voltage reference signal can be adjusted in a gradual manner when the output voltage setting signal changes, such that the peak value of the primary current of the isolated switching converter remains less than the current threshold, and the overvoltage protection may not be triggered. When the peak value of the primary current reaches the current threshold, the overvoltage protection threshold can be set corresponding to the output voltage setting signal and the overvoltage protection may be triggered in response to the output voltage feedback signal exceeding the overvoltage protection threshold, such that the overvoltage protection threshold can be changed adaptively with the output voltage. The overvoltage protection may not be triggered when the output voltage setting signal changes, and the overvoltage protection can be triggered when the secondary controller fails. Therefore, the reliability of the isolated switching converter can be improved.

Figure 9:
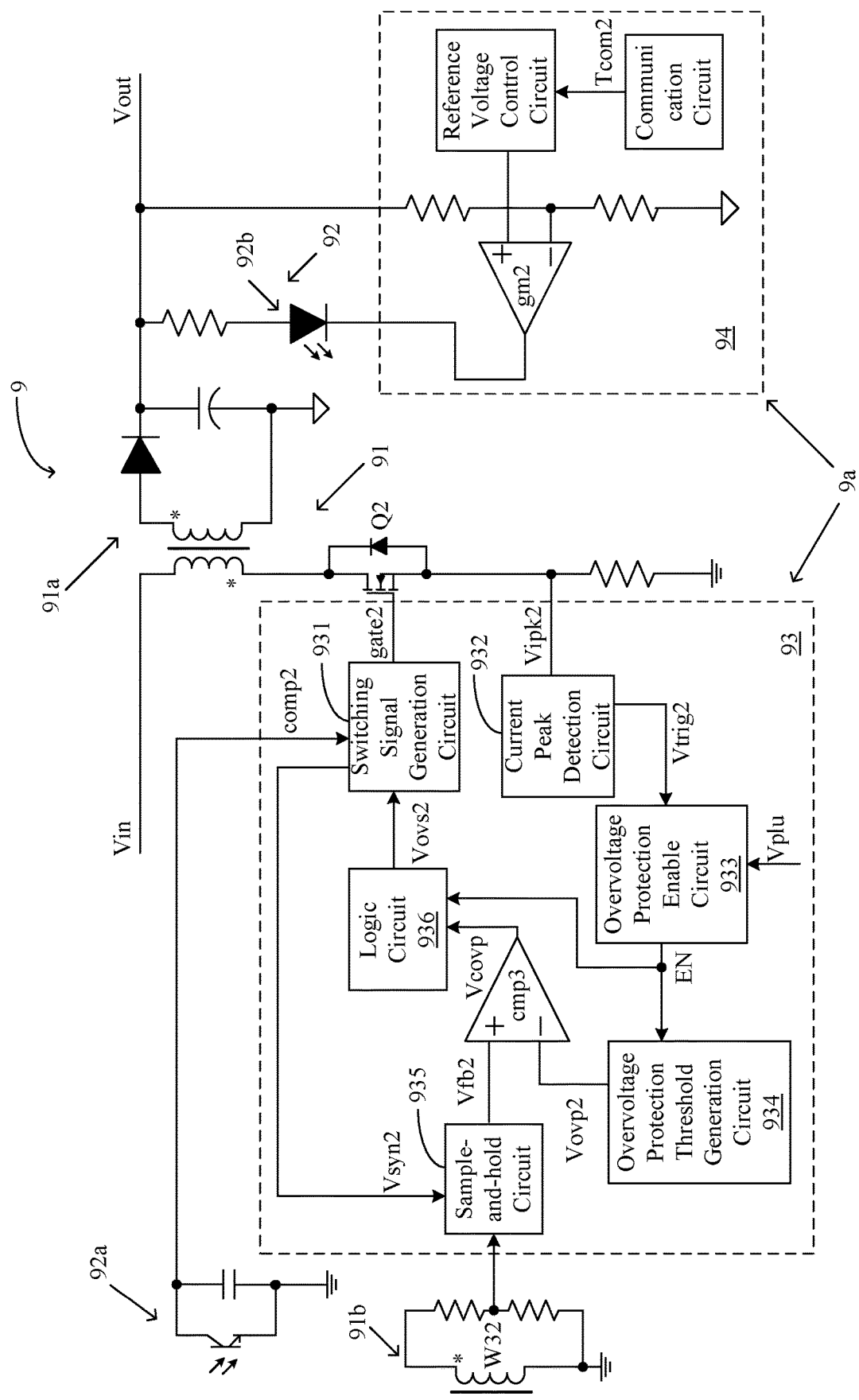
FIG. 9 is a schematic block diagram of a third example isolated switching converter, in accordance with embodiments of the present invention.

Referring now to FIG. 9, shown is a schematic block diagram of a third example isolated switching converter, in accordance with embodiments of the present invention. In the embodiments, isolated switching converter 9 can include power stage 91 (e.g., including circuits 91a and 91b), photoelectric coupling circuit 92 (e.g., including circuits 92a and 92b), and control circuit 9a. Control circuit 9a can include primary controller 93 and secondary controller 94. In particular embodiments, the overvoltage protection threshold can be set to be adapted to output voltage setting signal Tcom2 by primary controller during a period when the peak value of the primary current of power stage 91 reaches the current threshold. The overvoltage protection can be triggered when the output voltage feedback signal exceeds the overvoltage protection threshold. Therefore, the overvoltage protection threshold can adaptively change with output voltage Vout, and the overvoltage protection can be triggered when the secondary controller fails, thereby improving the reliability of the isolated switching converter.

Primary controller 93 can also generate switching control signal gate2 to drive power switch Q2 to be turned on and off according to compensation signal comp2, such that the output voltage of the isolated switching converter 9 can correspond to output voltage setting signal Tcom2. In this particular example, primary controller 93 can include switching signal generation circuit 931, current peak detection circuit 932, overvoltage protection enable circuit 933, overvoltage protection threshold generation circuit 934, sample-and-hold circuit 935, comparator cmp3, and logic circuit 936. Current peak detection circuit 932 can acquire primary current sampling signal Vipk2 of power stage 91, and may generate peak state signal Vtrig2. Overvoltage protection enable circuit 933 can generate overvoltage protection enable signal EN.

When peak state signal Vtrig2 is in a first state, overvoltage protection enable signal EN can be inactive, and when peak state signal Vtrig2 is in a second state, overvoltage protection enable signal EN may be active. Overvoltage protection threshold generation circuit 934 can generate overvoltage protection threshold Vovp2 adaptive to output voltage setting signal Tcom2 when overvoltage protection enable signal EN is active. Similarly, overvoltage protection threshold Vovp2 can be set to a preset value when overvoltage protection enable signal EN is inactive. Comparator cmp3 can compare overvoltage protection threshold Vovp2 against output voltage feedback signal Vfb2 and generate comparison signal Vcovp. Then, logic circuit 936 can generate overvoltage protection flag signal Vovs2 according to comparison signal Vcovp and overvoltage protection enable signal EN. In some examples, logic circuit 936 can be an AND-gate circuit, and overvoltage protection flag signal Vovs2 generated by logic circuit 936 can be active when both comparison signal Vcovp and overvoltage protection enable signal EN are active. Switching signal generation circuit 931 can trigger the overvoltage protection when overvoltage protection flag signal Vovs2 is active. That is, switching control signal gate2 can be controlled to be inactive to control power switch Q2 to be turned off.

When overvoltage protection flag signal Vovs2 is inactive, switching signal generation circuit 931 can also generate switching control signal gate2 according to compensation signal comp2, in order to control power switch Q2 to be turned on or off. Thus, output voltage Vout of isolated switching converter 9 can correspond to output voltage setting signal Tcom2. Sample-and-hold circuit 935 can sample and hold the voltage across auxiliary winding W32, in order to generate output voltage feedback signal Vfb2. In some examples, switching signal generation circuit 931 can further generate output voltage sampling pulse signal Vsyn2 according to switching control signal gate2. Then, sample-and-hold circuit 935 can sample and hold the voltage across auxiliary winding W32 after receiving output voltage sampling pulse signal Vsyn2.

Figure 10:
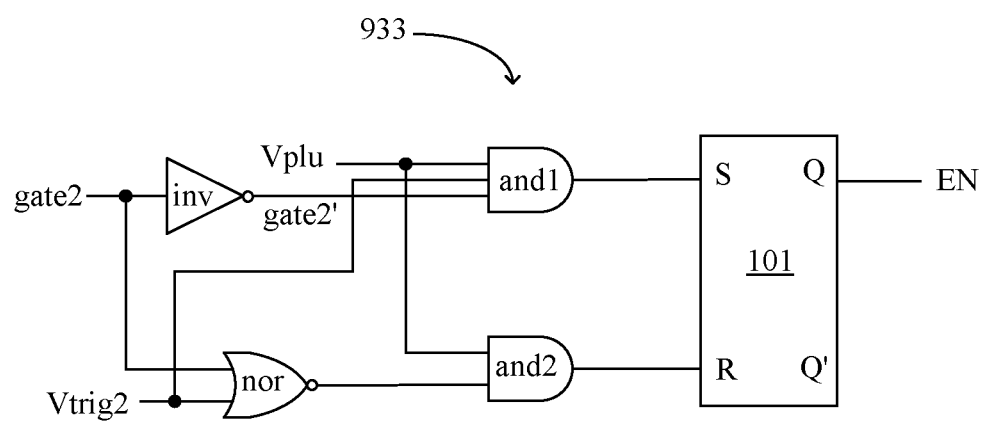
FIG. 10 is a schematic block diagram of an example overvoltage protection enable circuit, in accordance with embodiments of the present invention.

Referring now to FIG. 10, shown is a schematic block diagram of an example overvoltage protection enable circuit, in accordance with embodiments of the present invention. In this particular example, overvoltage protection enable circuit 933 can include inverter "inv," NOR gate circuit "nor," AND-gate "and1," AND-gate "and2," and RS flip-flop 101. Inverter inv can invert switching control signal gate2 to obtain inverted switching control signal gate2' which is transmitted to AND-gate and1. Input terminals of NOR-gate circuit nor can receive switching control signal gate2 and peak state signal Vtrig2, and NOR-gate circuit nor may generate an output signal to AND-gate and2. Input terminals of AND-gate and1 can receive peak state signal Vtrig2, pulse signal Vplu, and inverted switching control signal gate2', respectively, and an output terminal of AND-gate and1 can connect to set terminal S of RS flip-flop 101.

Input terminals of AND-gate and2 can receive the output signal of NOR-gate circuit nor and pulse signal Vplu, and an output terminal of AND-gate and2 can connect to reset terminal R of RS flip-flop 101. That is, RS flip-flop 101 can activate an active overvoltage protection enable signal EN when pulse signal Vplu, inverted switching control signal gate2', and peak state signal Vtrig2 are all active (e.g., switching control signal gate2 is inactive and peak state signal Vtrig2 is in the second state). RS flip-flop 101 can be reset to generate an inactive overvoltage protection enable signal EN when pulse signal Vplu is active, switching control signal gate2 is inactive and peak state signal Vtrig2 is inactive (e.g., the first state). Therefore, overvoltage protection enable signal EN may become active when output voltage Vout suddenly increases (e.g., due to a failure of secondary controller 24, etc.), such that overvoltage protection is triggered when output voltage feedback signal Vfb2 is greater than overvoltage protection threshold Vovp2, and the reliability of the isolated switching converter may accordingly be improved.

Figure 11:
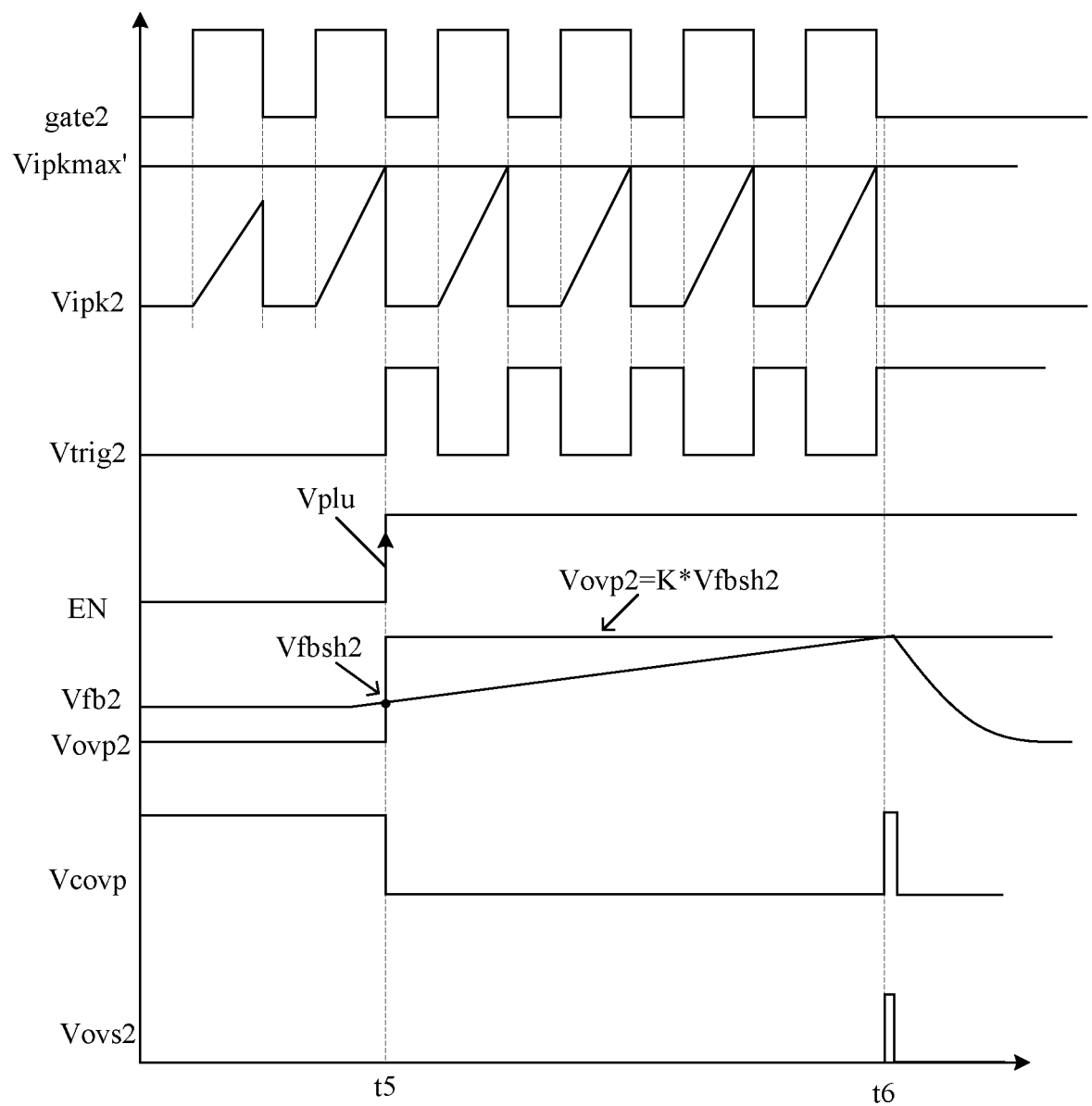
FIG. 11 is a waveform diagram of example operation of the third example isolated switching converter, in accordance with embodiments of the present invention.

Referring now to FIG. 11, shown is a waveform diagram of example operation of the third example isolated switching converter, in accordance with embodiments of the present invention. At time t5, the peak value of primary current sampling signal Vipk2 can reach current preset peak signal Vipkmax', and then peak state signal Vtrig2 may be set to be active. Moreover, at time t5, switching control signal gate2 can be set to be low, and overvoltage protection enable signal EN generated by overvoltage protection enable circuit 933 can be active in response to pulse signal Vplu. Thus, overvoltage protection threshold generation circuit 934 can generate overvoltage protection threshold Vovp2 adapted to output voltage setting signal Tcom2 in response to the active overvoltage protection enable signal EN.

For example, output voltage feedback signal Vfb2 can be sampled at time t5 to obtain sampling signal Vfbsh2, and overvoltage protection threshold Vovp2 may be set to be proportional to sampling signal Vfbsh2. For example, Vovp2=K* Vfbsh2, where K is a real number greater than 1 (e.g., K=1.2). In this way, an overvoltage protection threshold adapted to output voltage setting signal Tcom2 can be obtained. In addition, since the peak value of primary current sampling signal Vipk2 reaches current preset peak signal Vipkmax' in each switching cycle after time t5, overvoltage protection threshold Vovp2 may remain at K*Vfbsh2.

Until time t6, output voltage feedback signal Vfb2 may reach overvoltage protection threshold Vovp2, and thus comparison signal Vcovp can be set to be active. Also, at this time, overvoltage protection enable signal EN can be active. Therefore, at time t6, overvoltage protection flag signal Vovs2 generated by logic circuit 936 may be active in response to the active comparison signal Vcovp and overvoltage protection enable signal EN. Accordingly, switching control signal gate2 generated by switching signal generation circuit 931 can be inactive in response to the active overvoltage protection flag signal Vovs2, and thus power switch Q2 can be controlled to be turned off to realize overvoltage protection.

In particular embodiments, when the overvoltage protection enable signal is active, the overvoltage protection threshold can be set to be adapted to the output voltage setting signal to trigger the overvoltage protection when the output voltage feedback signal reaches the overvoltage protection threshold. In addition, when the overvoltage protection enable signal is inactive, the overvoltage protection may not be triggered so as to reduce the loss while ensuring the high reliability of the isolated switching converter.

In one embodiment, a method of controlling an isolated switching converter having an output voltage that is adjustable, can include: (i) sampling an output voltage of the isolated switching converter; (ii) setting an overvoltage protection threshold corresponding to the output voltage of the isolated switching converter when the isolated switching converter enters a protection mode; and (iii) triggering the overvoltage protection by comparing an output voltage feedback signal representing the output voltage against the overvoltage protection threshold.

Figure 12:
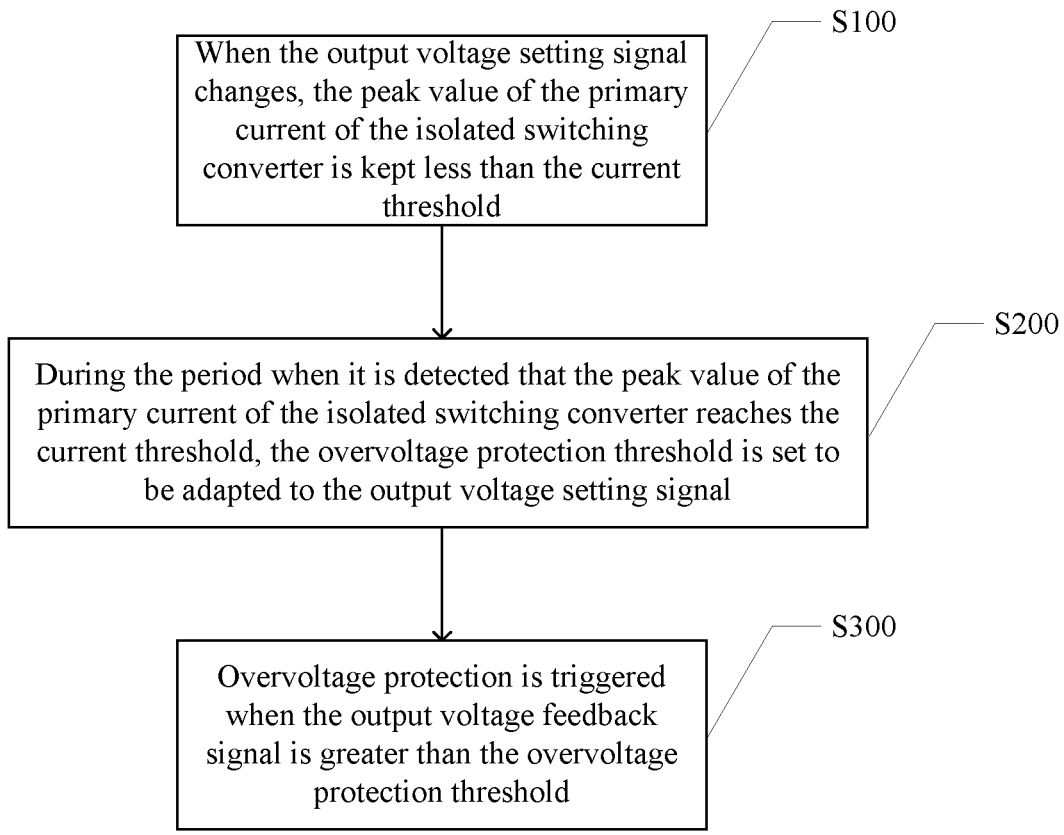
FIG. 12 is a flow diagram of an example overvoltage protection operation of the isolated switching converter, in accordance with embodiments of the present invention.

Referring now to FIG. 12, shown is a flow diagram of an example overvoltage protection operation of the isolated switching converter, in accordance with embodiments of the present invention. In particular embodiments, the output voltage of the isolated switching converter is adjustable. In this example overvoltage protection method, at S100, when the output voltage setting signal changes, the peak value of the primary current of the isolated switching converter may remain less than the current threshold. Here, the output voltage setting signal can be used for setting the output voltage reference signal, and the output voltage reference signal may be used for representing the expected value of the output voltage of the power stage of the isolated switching converter. In some examples, the output reference signal can be adjusted in a gradual manner when the output voltage setting signal changes, such that the peak value of the primary current of the isolated switching converter can remain less than the current threshold.

At S200, during the period when it is detected that the peak value of the primary current of the isolated switching converter reaches the current threshold, the overvoltage protection threshold can be set to be adapted to the output voltage setting signal. At S300, overvoltage protection may be triggered when the output voltage feedback signal is greater than the overvoltage protection threshold. In some examples, after detecting that the peak value of the primary current reaches the current threshold during N switching cycles (e.g., N is greater than or equal to 1), the output voltage feedback signal can be sampled to obtain a sampling signal, and the overvoltage protection threshold may be set according to the sampling signal.

In some examples, when it is not detected that the peak value of the primary current reaches the current threshold, the overvoltage protection threshold may be set as a preset value. The preset value can be independent of the current output voltage setting signal. In some examples, the overvoltage protection enable signal may be set to be inactive during the period when the peak value of the primary current is detected not to reach the current threshold, and the overvoltage protection enable signal can be set to be active during the period when the peak value of the primary current reaches the current threshold. The overvoltage protection may not be triggered when the overvoltage protection enable signal is inactive.

In some examples, when the peak value of the primary current is switched from less than the current threshold to greater than the current threshold, the output voltage feedback signal can be sampled to obtain a sampling signal, and the overvoltage protection threshold may be set to be K times the sampling signal (e.g., K is a real number greater than 1). In some examples, the output voltage feedback signal can be obtained by sampling and holding the voltage across the auxiliary winding. For example, the output voltage reference signal can be adjusted in a continuous gradual manner or a step gradual manner, such that the peak value of the primary current does not reach the current threshold under normal operation, thereby avoiding misoperation of the overvoltage protection and improving the reliability of the isolated switching converter.

In particular embodiments, the output voltage reference signal can be adjusted in a gradual manner when the output voltage setting signal changes, such that the peak value of the primary current of the isolated switching converter may remain less than a current threshold, and the overvoltage protection may not be triggered. When the peak value of the primary current reaches the current threshold, the overvoltage protection threshold can be set corresponding to the output voltage setting signal and the overvoltage protection may be triggered in response to an output voltage feedback signal exceeding the overvoltage protection threshold, such that the overvoltage protection threshold can be changed adaptively with the output voltage. In this way, the reliability of the isolated switching converter can be improved.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for an isolated switching converter, wherein:
   a) the control circuit is configured to determine whether to trigger an overvoltage protection in accordance with a comparison signal generated by comparing an output voltage feedback signal representing an output voltage of the isolated switching converter against an overvoltage protection threshold;
   b) the overvoltage protection threshold corresponds to the output voltage when the isolated switching converter enters a protection mode; and
   c) the overvoltage protection threshold is set to be a preset value when the isolated switching converter is in a normal operation mode.

2. The control circuit of claim 1, wherein when a peak value of a primary current of the isolated switching converter reaches a current threshold, the isolated switching converter enters the protection mode.

3. The control circuit of claim 1, wherein the overvoltage protection threshold is set positively correlated with the output voltage feedback signal sampled when the isolated switching converter enters a protection mode.

4. The control circuit of claim 1, wherein the preset value is not related to an output voltage setting signal that represents an expected output voltage of the isolated switching converter.

5. The control circuit of claim 1, wherein the preset value is set according to a maximum output voltage of the isolated switching converter.

6. The control circuit of claim 1, comprising:
 a) a current peak detection circuit configured to detect a primary current of the isolated switching converter, and to generate a peak state signal;
 b) an overvoltage protection threshold generation circuit configured to set the overvoltage protection threshold according to the peak state signal; and
 c) a comparison circuit configured to compare the output voltage feedback signal against the overvoltage protection threshold, and to generate the comparison signal.

7. The control circuit of claim 6, wherein:
 a) when the peak state signal is in a first state, the overvoltage protection threshold is set to be a preset value; and
 b) when the peak state signal is in a second state, the overvoltage protection threshold is set to be corresponding to the current output voltage of the isolated switching converter.

8. The control circuit of claim 6, wherein the overvoltage protection threshold generation circuit is configured to set the overvoltage protection threshold to be K times a sampling signal generated by sampling the output voltage feedback signal when the peak state signal switches from the first state to the second state, wherein K is a real number greater than 1.

9. The control circuit of claim 6, further comprising:
 a) an overvoltage protection enable circuit configured to generate an overvoltage protection enable signal according to the peak state signal and a pulse signal, wherein the overvoltage protection enable signal is inactive when the peak state signal is in a first state, and the overvoltage protection enable signal is active when the peak state signal is in a second state; and
 b) a logic circuit configured to trigger the overvoltage protection according to the overvoltage protection enable signal and the comparison signal.

10. The control circuit of claim 9, wherein:
 a) when the overvoltage protection enable signal is inactive, and the overvoltage protection threshold is set to be a preset value; and
 b) when the overvoltage protection enable signal is active, the overvoltage protection threshold is set to be corresponding to the current output voltage of the power stage.

11. The control circuit of claim 1, further comprising a switching signal generation circuit configured to generate a switching control signal to control on and off states of a power switch of the isolated switching converter in accordance with the comparison signal and a compensation signal that represents an error between an output voltage reference signal and an output division voltage representing the output voltage.

12. The control circuit of claim 11, wherein the output voltage reference signal is adjusted in a continuously gradual manner or a step gradual manner when an output voltage setting signal that represents an expected output voltage of the isolated switching converter changes.

13. A method of controlling an isolated switching converter having an output voltage that is adjustable, the method comprising:
 a) sampling the output voltage of the isolated switching converter;
 b) setting an overvoltage protection threshold corresponding to the output voltage of the isolated switching converter when the isolated switching converter enters a protection mode;
 c) triggering the overvoltage protection by comparing an output voltage feedback signal representing the output voltage against the overvoltage protection threshold; and
 d) setting the overvoltage protection threshold to be a preset value when the isolated switching converter is in a normal operation mode.

14. The method of claim 13, further comprising:
 a) sampling a peak value of a primary current of the isolated switching converter; and
 b) setting the overvoltage protection threshold to be corresponding to an output voltage setting signal representing an expected output voltage of the isolated switching converter when the peak value of the primary current reaches a current threshold.

15. The method of claim 13, further comprising:
 a) sampling a peak value of a primary current of the isolated switching converter; and
 b) setting the overvoltage protection threshold to be the preset value when the peak value of the primary current is kept less than the current threshold.

16. The method of claim 13, further comprising setting the overvoltage protection threshold positively correlated with the output voltage feedback signal when the isolated switching converter enters a protection mode.

17. The method of claim 13, wherein the preset value is not related to an output voltage setting signal that represents an expected output voltage.

18. The method of claim 13, further comprising adjusting an output voltage reference signal in a gradual manner according to an output voltage setting signal that represents an expected output voltage of the isolated switching converter when the output voltage setting signal changes.

* * * * *